(12) United States Patent  
Chen et al.

(10) Patent No.: US 8,565,133 B2
(45) Date of Patent: Oct. 22, 2013

(54) SYNCHRONIZATION-FREE STATION LOCATOR IN WIRELESS NETWORK

(75) Inventors: Qifan Chen, Shanghai (CN); Ning Zhang, Saratoga, CA (US); James Cho, Mountain View, CA (US); William J. McFarland, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/541,635

(22) Filed: Jul. 3, 2012

(65) Prior Publication Data

US 2012/0269170 A1    Oct. 25, 2012

Related U.S. Application Data

(62) Division of application No. 12/553,757, filed on Sep. 3, 2009, now Pat. No. 8,233,457.

(51) Int. Cl.
| | |
|---|---|
| *H04B 7/02* | (2006.01) |
| *H04W 4/00* | (2009.01) |
| *H04W 24/00* | (2009.01) |
| *H04J 3/06* | (2006.01) |

(52) U.S. Cl.
USPC ........ 370/310.2; 370/338; 370/346; 370/350; 455/456.1

(58) Field of Classification Search
USPC ................. 370/229–239, 310–350, 464–468, 370/498–519; 455/63.1, 422.1–423, 455/455–466
See application file for complete search history.

(56) References Cited

U.S. PATENT DOCUMENTS

| | | | |
|---|---|---|---|
| 6,108,558 A | 8/2000 | Vanderspool, II | |
| 6,801,782 B2 * | 10/2004 | McCrady et al. | 455/517 |
| 7,057,557 B2 | 6/2006 | Lee | |
| 7,065,369 B2 * | 6/2006 | Tang et al. | 455/456.1 |
| 7,215,966 B2 * | 5/2007 | Joshi | 455/456.1 |
| 7,574,216 B2 * | 8/2009 | Leitch et al. | 455/456.1 |
| 7,800,531 B2 | 9/2010 | Wang et al. | |
| 7,877,100 B2 * | 1/2011 | Rick et al. | 455/456.1 |
| 8,026,850 B2 * | 9/2011 | Seong et al. | 342/387 |
| 8,160,609 B2 * | 4/2012 | Alles et al. | 455/456.1 |
| 8,184,038 B2 * | 5/2012 | Ekbal et al. | 342/109 |
| 8,233,457 B1 | 7/2012 | Chen et al. | |
| 8,335,173 B2 * | 12/2012 | Hart et al. | 370/310 |

(Continued)

FOREIGN PATENT DOCUMENTS

| | | |
|---|---|---|
| EP | 320913 A2 * | 6/1989 |
| EP | 1253437 A2 | 10/2002 |
| EP | 1587255 A1 * | 10/2005 |
| WO | WO2005006593 A1 | 1/2005 |

*Primary Examiner* — Tri H Phan
(74) *Attorney, Agent, or Firm* — Bever, Hoffman & Harms, LLP

(57) ABSTRACT

A method of providing synchronization-free station locating in a wireless network is provided. In this method, an AP having a known location sends a unicast packet to the station and notes its time of departure TOD(D). The station receives the unicast packet, notes its time of arrival TOA(D), sends an acknowledgement packet to the AP, and notes its time of departure TOD(D_ACK). The AP receives the acknowledgment packet and notes its time of arrival TOA(D_ACK). Notably, a distance between the AP and the station can be accurately determined using a first difference between the TOA(D_ACK) and the TOD(D) and a second difference between the TOD(D_ACK) and the TOA(D). A plurality of such computed distances between a plurality of APs and the station can be used to determine an accurate location of the station.

39 Claims, 12 Drawing Sheets

(56) References Cited

U.S. PATENT DOCUMENTS

| | | |
|---|---|---|
| 8,370,629 B1 | 2/2013 | Ngo et al. |
| 2002/0194266 A1 | 12/2002 | Brebner et al. |
| 2003/0103475 A1 | 6/2003 | Heppe et al. |
| 2003/0118015 A1 | 6/2003 | Gunnarsson et al. |
| 2005/0124319 A1 | 6/2005 | Williams et al. |
| 2005/0124355 A1 | 6/2005 | Cromer et al. |
| 2006/0052115 A1 | 3/2006 | Khushu |
| 2006/0148486 A1 | 7/2006 | Kim et al. |
| 2007/0025296 A1 | 2/2007 | Jung et al. |
| 2007/0121560 A1 | 5/2007 | Edge |
| 2008/0109885 A1 | 5/2008 | Sim et al. |
| 2008/0291883 A1 | 11/2008 | Seok |
| 2009/0079622 A1 | 3/2009 | Seshadri et al. |
| 2009/0121927 A1 | 5/2009 | Moshfeghi |
| 2009/0224967 A1 | 9/2009 | Wang et al. |
| 2010/0135178 A1 | 6/2010 | Aggarwal et al. |

* cited by examiner

AP w/o station support
technique
(APs change channels)
900

FIG. 9

Host PC notifies related APs to
enter location mode
901

↓

Host PC tells related APs to
start location measurements
902

↓

Host PC tells each related AP the
channel to go to, the BSSID of the
associated AP, and the station ID
903

↓

Related AP sends CTS to station
to inform its transmission is
temporarily stopped
904

↓

Each related AP switches to
station's channel, sends unicast
packet with "borrowed" BSSID,
and notifies host PC when
measurement is done
905

SYNCHRONIZATION-FREE STATION LOCATOR IN WIRELESS NETWORK

RELATED APPLICATIONS

This application is a divisional of U.S. patent application Ser. No. 12/553,757, entitled "Synchronization-Free Station Locator In Wireless Network" filed Sep. 3, 2009.

BACKGROUND OF THE INVENTION

1. Field of the Invention

The present invention relates to location measurement, and in particular to accurately determining the location of a station in a wireless network.

2. Related Art

The IEEE 802.11 family of standards governs wireless networking transmission. A proposed amendment to these standards, 802.11v, would provide a range of benefits including, but not limited to, advanced energy conservation, timing synchronization, and real time location service (RTLS). The RTLS is meant to allow tracking of compatible Wi-Fi enabled devices to facilitate asset tracking as well as security and emergency services.

In general, knowing the coverage zone (e.g. a radius r) of an access point (AP) and that a Wi-Fi client (hereinafter station) is associated with that AP can provide a rudimentary approximation of the location of that station (i.e. within r distance). To get a more accurate location, multiple APs can be used simultaneously, wherein each AP has a known coverage zone.

In another technique, a received signal strength indicator (RSSI) can be measured based on signals received by each AP from the station. A stronger RSSI means that a station is closer to the AP, whereas a weaker RSSI means that the station is farther from the AP. Multiple RSSI measurements, when compiled by a central processer, can be used to provide a relatively accurate location for the station.

Unfortunately, using either the AP zone technique or the RSSI technique still cannot consistently provide the accuracy needed for asset tracking as well as security and emergency services. Therefore, a need arises for a technique that can consistently provide accurate locating using a wireless network.

SUMMARY OF THE INVENTION

In a wireless network, the real time location service (RTLS) is meant to allow tracking of compatible Wi-Fi enabled devices to facilitate asset tracking as well as security and emergency services. Unfortunately, conventional station locating techniques cannot consistently provide the accuracy needed for asset tracking or security and emergency services. Station locating techniques that can provide this accuracy typically require synchronization between access points (APs) (having known locations) and the station (having an unknown location). This synchronization is non-trivial and uses valuable system resources.

Therefore, a method of providing synchronization-free station locating in a wireless network is provided. In this method, the AP sends a unicast packet to the station and notes its time of departure TOD(D). The station receives the unicast packet and notes its time of arrival TOA(D). The station sends an acknowledgement packet to the AP and notes its time of departure TOD(D_ACK). The AP receives the acknowledgment packet and notes its time of arrival TOA(D_ACK).

Notably, a distance between the AP and the station can be accurately determined using a first difference between the TOA(D_ACK) and the TOD(D) and a second difference between the TOD(D_ACK) and the TOA(D). Because these differences are computed for each device, i.e. the first difference for the AP and the second difference for the station, the need for synchronization between the AP and station is eliminated. A plurality of such computed distances between the plurality of APs and the station can be used to determine an accurate location of the station.

In determining the distance between the AP and the station, the computation can further include determining a delay $T_{1,i}$, a delay $T_3$, a delay $T_1$, and a delay $T_{3,i}$, wherein i designates the AP, the delay $T_{1,i}$ is a time delay from the TOD(D) to transmission of the unicast packet by an AP antenna, the delay $T_3$ is a time delay from receipt of the unicast packet by a station antenna to the TOA(D), the delay $T_1$ is a time delay from the TOD(D_ACK) to transmission of the acknowledgement packet by the station antenna, and the delay $T_{3,i}$ is a time delay from receipt of the acknowledgement packet by the AP antenna to the TOA(D_ACK). The computation can yet further include determining $t_{1,i}$, $t_2$, $t_3$, and $t_{4,i}$, wherein $t_{1,i}$ is the TOD of the unicast packet in the AP, $t_2$ is the TOA of the unicast packet in the station, $t_3$ is the TOD of the acknowledgement packet in the station, and is the TOA of the acknowledgement packet in the AP. For example, determining a distance $d_i$ between the AP and the station includes computing:

$$d_i = ((t_{4,i} - t_{1,i}) - (t_3 - t_2) - T_{1,i} - T_{3,1} - T_1 - T_3)/2 * SOL$$

where SOL is the speed of light.

Notably, while the difference between TOD(D-ACK) and TOA(D), including their associated fine correction values T3 and T1 is helpful, correct positioning can be found in some cases without these values. For example, if the difference of TOD(D-ACK) and TOA(D), and any associated fine correction values, is consistent over time, the difference TOD(D-ACK) and TOA(D) often cancel out in the calculations. When this cancellation occurs, the location of the device can be calculated without knowing the difference of TOD(D-ACK) and TOA(D) (and their fine corrections) explicitly. In this case, the distance can be computed using:

$$d_i = ((t_{4,i} - t_{1,i}) - (K) - T_{1,i} - T_{3,1})/2 * SOL$$

wherein C is a known constant or a known averaged value as discussed below.

There are several ways that the consistency of the difference of TOD(D-ACK) and TOA(D) can be achieved. First, it may be the case that all ranging measurements have the same device receiving the (D) packet and sending the (D-ACK) packet. If this device has a consistent delay between the two events, the TOD(D-ACK) and TOA(D) time difference will be consistent for all measurements. If there is some variance in the difference of TOD(D-ACK) and TOA(D), but on average the value is consistent, multiple measurements could be made, and the results averaged. The averaged measurements would converge to the consistent value of TOD(D-ACK) minus TOA(D), again allowing cancellation of this variable from the equations.

In other embodiment, multiple devices can observe the same single packet exchange which guarantees that the difference of TOD(D-ACK) and TOA(D) are consistent in all measurements, thereby allowing cancellation in the resulting equations computing location. Finally, there are some scenarios in which the packet exchanges between devices result in different devices effecting the value TOD(D-ACK) minus TOA(D). In that case, if all devices used in the measurements are designed to provide exactly the same performance with regard to the difference of TOD(D-ACK) and TOA(D), cancellation in the calculations can again occur. Finally, each device can be characterized for its own TOD(D-ACK) minus TOA(D), and this can be communicated to the device doing the calculation. In this way, even if the different devices participating in the measurements do not have the same delays, the value is known for each device and the calculation can proceed.

In one embodiment, the method can further include adjusting/correcting the TOA(D) and/or the TOA(D_ACK). For example, in one embodiment correcting a time of arrival of a data symbol at a device in a wireless network can include performing coarse timing on a short training field of a data packet to generate a coarse symbol boundary of a long training field (LTF). A cross-correlation can be performed between a known LTF sequence and an actual LTF sequence, wherein the actual LTF sequence starts at the coarse symbol boundary. A first peak of cross-correlation results can be identified as being a first arrival path. This first arrival path can be used to compute the time of arrival of the data symbol.

In another embodiment, a guard interval and its corresponding OFDM symbol tail can be used to correct the time of arrival of the data symbol. In this embodiment, a fine timing estimate can be performed on a data packet to locate a guard interval. A cross-correlation can be performed between the guard interval and its corresponding OFDM symbol tail. A strongest path of the cross-correlation can be aligned such that a first predetermined number of samples are provided pre-cursor and a second predetermined number of samples are provided post-cursor. The first correlation peak in the pre-cursor part corresponds to the first arrival path.

In another embodiment, a long training field and an inverse fast Fourier transform (IFFT) can be used to correct the time of arrival of the data symbol. In this embodiment, a channel estimate can be obtained using a long training field (LTF). The channel estimate can be manipulated using an inverse fast Fourier transform (IFFT) to generate a channel delay profile. The first signal of the channel delay profile exceeding a predetermined threshold can be identified. The time of arrival can be computed based on this first signal.

In one embodiment of this synchronization-free station locating method, the station can determine a list of APs that it can hear. At this point, the station can send a multicast packet to the APs on the list when the station changes channels. After the station performs distance measurements on a channel with the AP(s) on the list operating on the channel, the station can change its channel and repeat these steps until all APs on the list and the station have performed distance measurements.

Another method of providing synchronization-free station locating in a wireless network is provided. In this wireless network, the APs have station locating capability, but the station does not provide locating support. In this method, each AP receives a channel identification of the station, an associated AP identification, and station identification. Each AP then switches to a channel corresponding to the channel identification, sends the unicast packet to the station using the associated AP identification, and receives the acknowledgment packet. At this point, a delta distance between the station and two APs can be determined. Finally, a plurality of computed delta distances can be used to determine a location of the station.

Yet another method of providing synchronization-free station locating in a wireless network is provided. In this wireless network, the APs have station locating capability, but the station does not provide locating support. In this method, after the unicast/acknowledgement set of packets are sent/received, the AP refuses to associate with the station, thereby forcing the station to try to associate with another of the plurality of APs. A delta distance between the station and two APs can be determined based on computed distances from the APs. A plurality of computed delta distances can be used to determine a location of the station. In one embodiment, the unicast packet can be replaced with a probe request packet.

Yet another method of providing synchronization-free station locating in a wireless network is provided. In this wireless network, the APs have station locating capability, but the station does not provide locating support. In this method, a set of APs switch to the channel used by the station and the set of APs enter a promiscuous mode that allows overhearing an exchange between the associated AP and the station. The exchange includes the unicast/acknowledgment packets. A distance between the station and each AP (i.e. the associated AP and the set of APs) can be determined based on information from the exchange. A plurality of computed distances can be used to determine a location of the station.

Yet another method of providing synchronization-free station locating in a wireless network is provided. In this wireless network, the APs lack station locating capability, but the station can support that capability. In this method, the station sends a unicast packet to a AP and notes its time of departure TOD(D). That AP receives the unicast packet and sends an acknowledgement packet in response. The station receives the acknowledgment packet and notes its time of arrival TOA (D_ACK). After this exchange is complete, the station disassociates with that AP and re-associating with another AP. A delta distance between the station and two APs can be determined. A plurality of computed delta distances can be used to determine a location of the station.

Yet another method of providing synchronization-free station locating in a wireless network is provided. In this wireless network, a first device has an unknown location whereas a second device has a known location. In this method, the second device sends a first packet to the first device and notes its time of departure TOD(D). This first packet can be a unicast packet or a probe response packet. The first device receives the first packet and notes its time of arrival TOA(D). The first device then sends an acknowledgement packet to the second device and notes its time of departure TOD(D_ACK). The second device receives the acknowledgment packet and notes its time of arrival TOA(D_ACK). A distance between the first device and the second device can be computed using a first difference between the TOA(D_ACK) and the TOD(D) and a second difference between the TOD(D_ACK) and the TOA(D). The second device can be moved to another known location and repeating the packet exchange and computation. A plurality of computed distances between the first and second devices can be used to determine a location of the first device.

Yet another method of providing synchronization-free station locating in a wireless network is provided. In this wireless network, a first device has an unknown location whereas a second device has a known location. In this method, the second device sends a first packet to the first device and notes its time of departure TOD(D). This first packet can be a unicast packet or a probe response packet. The first device receives the first packet and notes its time of arrival TOA(D). The first device then sends an acknowledgement packet to the second device and notes its time of departure TOD(D_ACK). The second device receives the acknowledgment packet and notes its time of arrival TOA(D_ACK). A distance between the first device and the second device can be computed using a first difference between the TOA(D_ACK) and the TOD(D) and a second difference between the TOD(D_ACK) and the TOA(D). The location of the first device can be determined by using the computed distance and at least one constraint regarding an environment of the first device. In one embodiment, the constraint is a map (e.g. a floor plan of a building or set of rooms indicating objects other than the first device).

Notably, the above-described synchronization-free location technique can include locating any device having an unknown location (DUL) using a plurality of devices having known locations (DKLs). For example, in one embodiment, a DUL could be an AP that has not yet shared its location with other devices. In another embodiment, a DKL could be a station that has a known, fixed location in the wireless network.

BRIEF DESCRIPTION OF THE FIGURES

FIG. 9 illustrates another exemplary synchronization-free distance measurement technique using APs that change channels and a station without location support capability (e.g. a legacy station).

DETAILED DESCRIPTION OF THE FIGURES

The location of a device in a wireless network can be accurately determined without using synchronization. As described in further detail below, the time of departure (TOD) of a signal to be transmitted and the time of arrival (TOA) of that signal can be used to determine an accurate distance between devices. This technique, called the TOD/TOA technique, can ensure an accurate device location using only a limited number of devices having known locations in the wireless network. A plurality of computed distances between the first and second devices can be used to determine a location of the first device.

Figure 1:
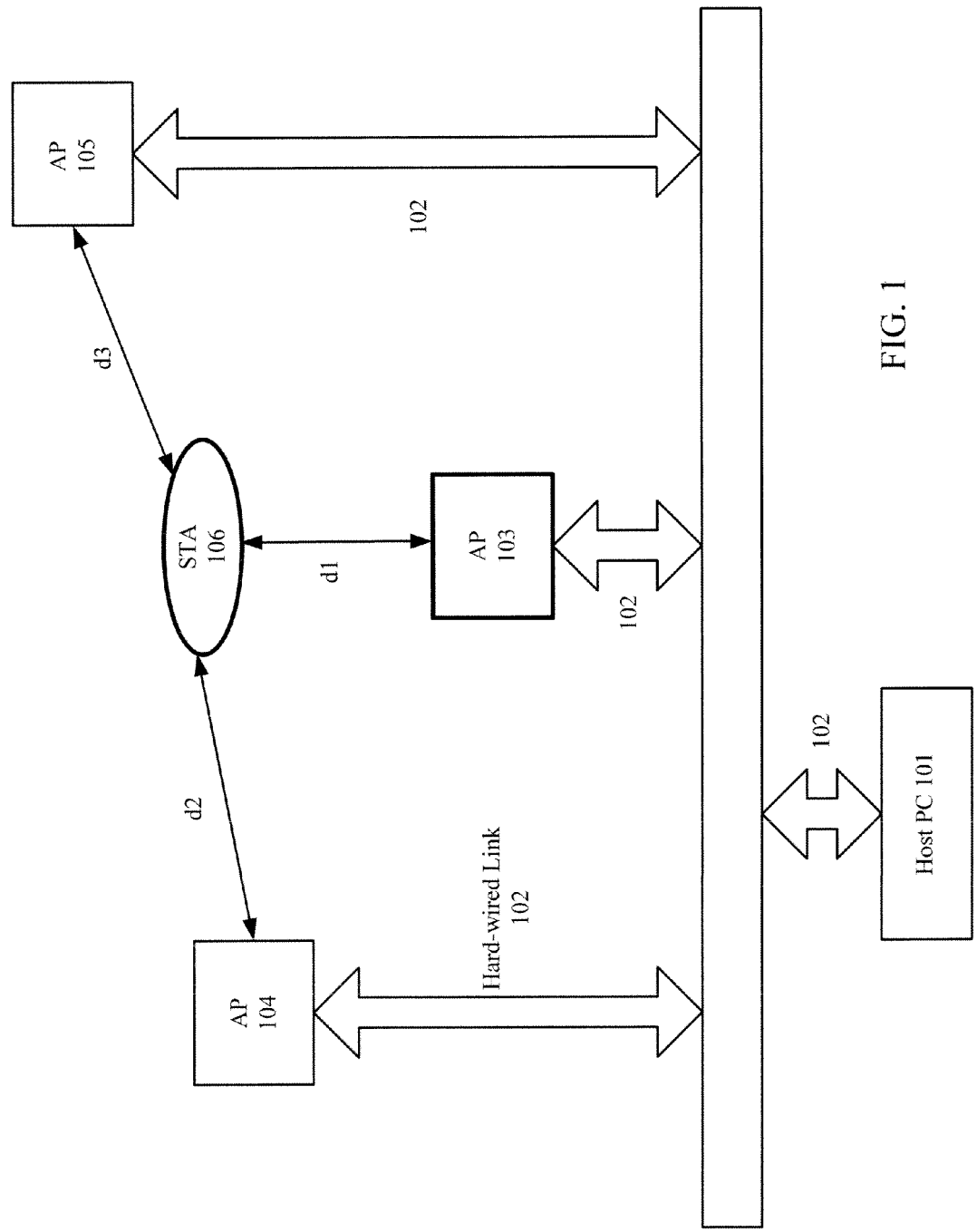
FIG. 1 illustrates an exemplary multiple wireless network configuration that facilitates determining a location of a station.

For example, FIG. 1 illustrates a plurality of access points (APs), i.e. APs 103, 104, and 105, which can communicate with a host PC 101 via a hard-wired network 102. In a corresponding wireless network, a station 106 is associated with AP 103, but has the capability of communicating also with APs 104 and 105. Note that in the TOD/TOA technique, the location of each AP is known, each AP has a line of sight (LOS) with station 106, and the location of station 106 is fixed (at least during the location measurement time). Using these assumptions, a distance d1 (the distance between station 106 and AP 103) could be computed by determining the time it takes a signal to travel between station 106 and AP 103 and then multiplying that time by the speed of light (SOL); a distance d2 could be computed by determining the time it takes a signal to travel between station 106 and AP 104 and then multiplying that time by the SOL; and a distance d3 could be computed by determining the time it takes a signal to travel between station 106 and AP 105 and then multiplying that time by the SOL.

Figure 2:
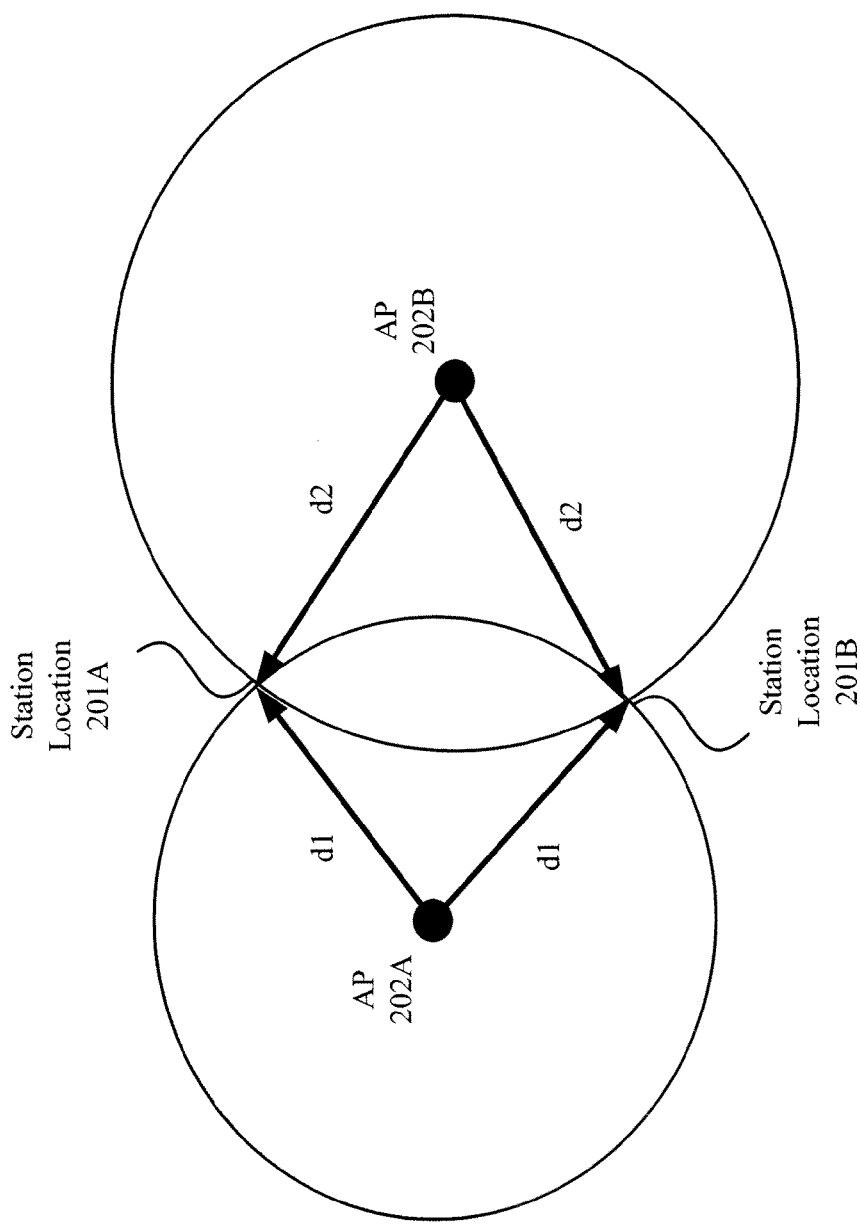
FIG. 2 illustrates why using information from only two access points (APs) may result in ambiguity in station location.

Note that using 2 APs for station locating may result in some ambiguity. For example, referring to FIG. 2, when the distances from a station to two APs 202A and 202B are computed (e.g. distances d1 and d2, respectively), two possible locations 201A and 202A for the station result. Thus, in accordance with one aspect of an accurate station locating technique, at least 3 APs can be used to provide two-dimensional locating and at least 4 APs can be used to provide three-dimensional locating. However, in some cases accurate location can still be determined with fewer APs, if other constraints are applied. Such constraints could include that the device is known to be in the building, or the device is known to be on the first floor of a building.

Figure 3:
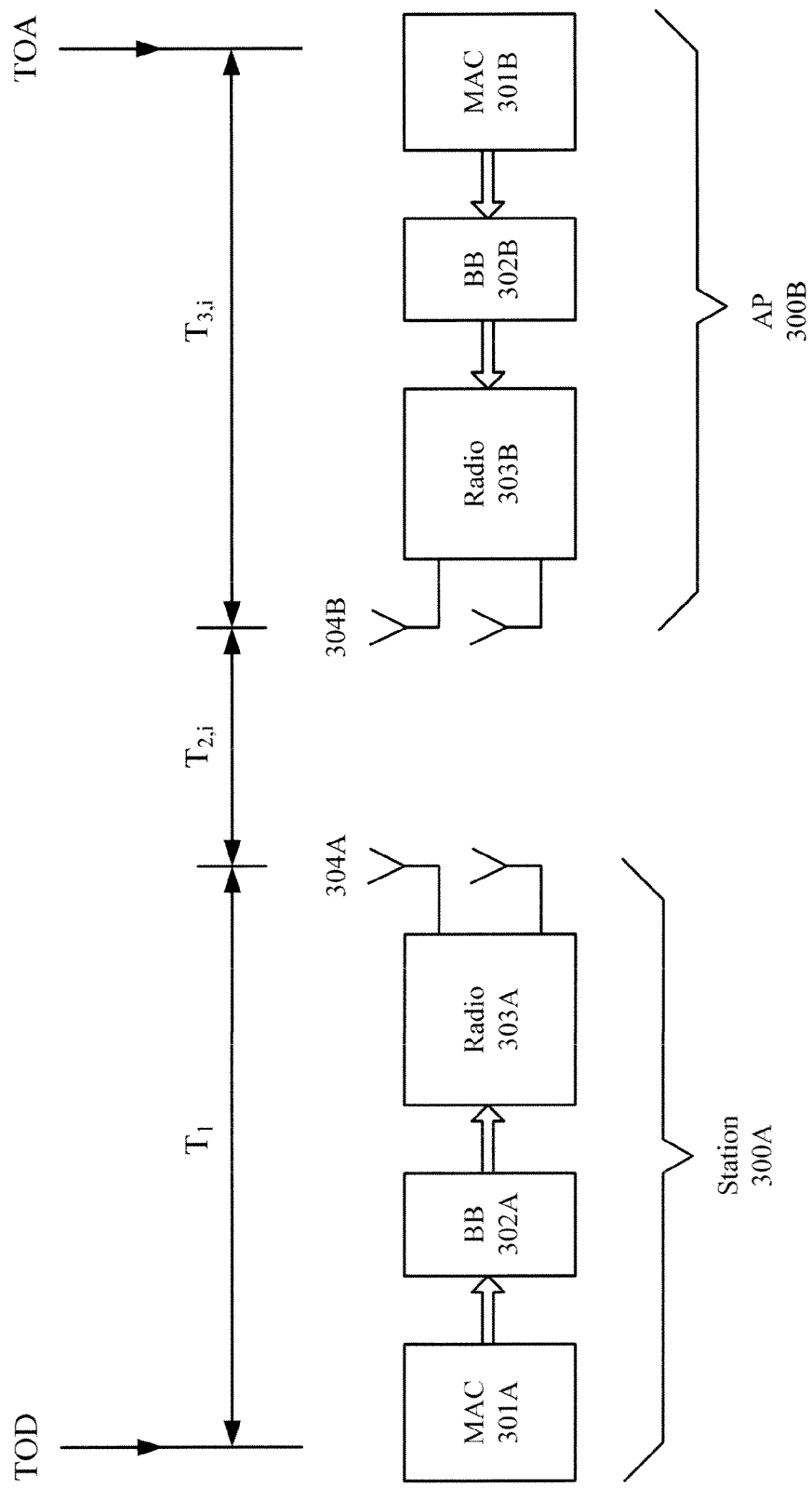
FIG. 3 illustrates exemplary timing information for a packet sent by a station to an AP.

FIG. 3 illustrates exemplary timing information for a packet sent by a station 300A to an AP 300B. In station 300A, a packet is created in a media access controller (MAC) 301A, is converted to a digital baseband (BB) signal in a BB unit 302A, and is transmitted using a radio path 303A and an antenna 304A. In AP 300B, the packet is received using an antenna 304B and a radio path 303B, converted to a digital baseband signal using a BB unit 302B, and is processed in a MAC 301B. In one embodiment, this packet is a multicast packet transmission sent to multiple APs (with only one AP being shown in FIG. 3).

In one embodiment, the time of delivery (TOD) can be a time stamp assigned by MAC 301A at the start of packet transmission. The time $T_1$ can represent the delay in station 300A from the TOD until the packet is transmitted via antenna 304A. The time $T_{3,i}$ can represent the delay in the AP (wherein "i" designates a specific AP, e.g. AP 300B) from when antenna 304B receives the packet until the time of arrival (TOA), i.e. at a predetermined point in packet processing by MAC 301B as marked by a time stamp. Note that times $T_1$ and $T_{3,i}$ can be considered as fixed for a specific vendor's product. Therefore, the generic, measured distance $d_i$ between station 300A and AP 300B can be computed as:

$$d_i = T_{2,i} * SOL$$

where time $T_2 = TOA - TOD - T_{3,i} - T_1$. The distance $d_i$, in combination with computed distances from other APs, can be used by the host PC (e.g. host PC 101, shown in FIG. 1) to determine the position of station 300A. For ease of reference, this technique can be called a TOA method.

To accomplish this distance measurement in the TOA method, three requirements must be satisfied. First, station

300A and AP 300B must be synchronized, which can include a synchronization of their respective clocks as well as minimizing any frequency drift (also called frequency offset) (measured by parts-per-million (ppm)). Second, the times $T_1$ and $T_{3,i}$ must be calibrated for station 300A and AP 300B, respectively. Third, the time stamps associated with TOD and TOA must be set consistently with respect to the packet. For example, time stamping a TOD should be set consistently at the same moment of transmitting a packet and time stamping a TOA should be set consistently at the same moment of receiving a packet. Of the three requirements, the synchronization requirement can be the most challenging.

In another embodiment, instead of computing the absolute distance $d_i$, the differences between computed distances (called the delta distance measurements) can be estimated. This computation is called a time difference of arrival (TDOA) method herein. In one embodiment, a station can send a multicast packet to a plurality of APs to compute the delta distance measurement.

When the related $AP_i$ and $AP_j$ (e.g. any two of APs 104, 105, and 106 in FIG. 1) are in the same channel, the delta distance can be computed as:

$$\Delta d_{i,j} = d_i - d_j = ((TOA_i - T_{3,i}) - (TOA_j - T_{3,j})) * SOL$$

To accomplish this distance measurement with the TDOA method, three requirements must be satisfied. First, all the APs used in the locating must be synchronized (instead of synchronization between the station and each AP). Second, the time $T_3$ must be calibrated for each AP. Third, the time stamp associated with TOA in each AP must be set consistently.

In contrast, when the related $AP_i$ and $AP_j$ are in different channels, the delta distance can be computed as:

$$\Delta d_{i,j} = d_i - d_j = ((TOA_i - T_{3,i}) - (TOA_j - T_{3,j}) - (TOD_i - TODO)) * SOL$$

To accomplish this distance measurement (i.e. when the related $AP_i$ and $AP_j$ are in different channels) with the TDOA method, four requirements must be satisfied. First, all APs used in the locating must be synchronized. Second, the time $T_3$ must be calibrated for each AP. Third, the time stamp associated with TOA in each AP and the time stamp associated with TOD in the station must be set consistently. Fourth, if $TOD_i - TOD_j$ is large, then the effect of the frequency offset at the station must be removed. Notably, in either TDOA method embodiment, the synchronization requirement (the most challenging of the requirements) remains.

Advantageously, as explained in detail below, this synchronization requirement can be substantially eliminated, thereby dramatically simplifying the station locating. In this synchronization-free station location technique, each AP participating in station locating can send a unicast packet to the station. This unicast packet is sent with the sole intent of facilitating an accurate distance measurement between the station and that AP.

Figure 4:
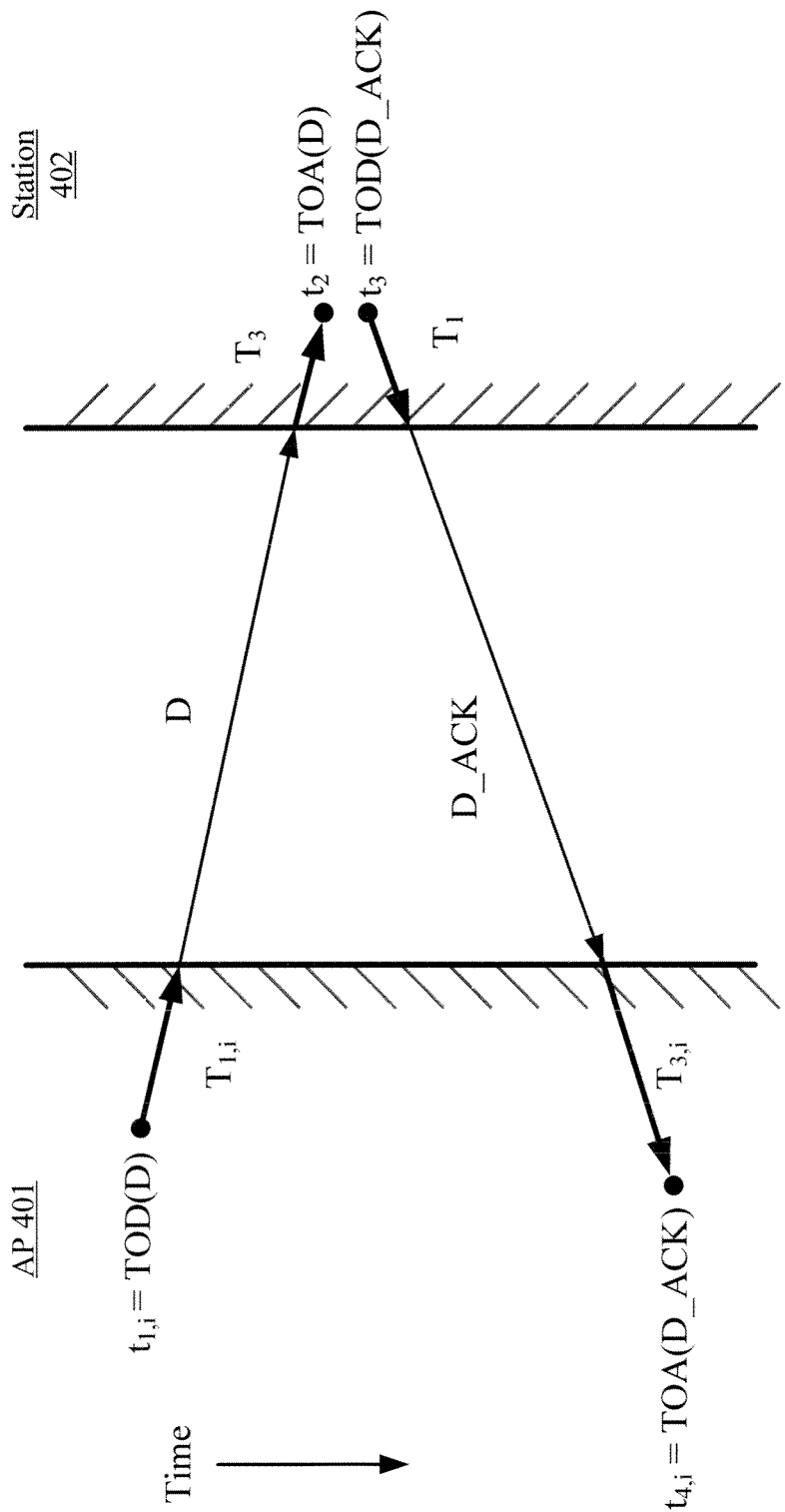
FIG. 4 illustrates an AP sending a unicast packet and a station sending a corresponding acknowledgement packet, wherein variables associated with the unicast packet and the acknowledgement packet can be used in an accurate distance measurement computation.

FIG. 4 illustrates an AP 401 that can send such a unicast packet D to a station 402. As mandated by the 802.11 family of standards, when a unicast packet is received, an acknowledgement packet must be sent in response. Therefore, in response to receiving unicast packet D, station 402 sends an acknowledgement packet D_ACK to AP 401. When unicast packet D and acknowledgement packet D_ACK are successfully transmitted and received, a distance measurement transaction is completed and a corresponding distance measurement between AP 401 and station 402 can be obtained.

In FIG. 4, $t_i$ is the TOD of the unicast packet in AP 401, $T_{1,i}$ is the delay from t1 until the unicast packet is sent from the AP antenna, $T_3$ is delay from receipt at the station antenna until $t_2$, $t_2$ is the TOA of the unicast packet in station 402, $t_3$ is the TOD of the acknowledgement packet in station 402, $T_1$ is the delay from t3 until the acknowledgement packet is sent from the station antenna, $T_{3,i}$ is the delay from receipt at the AP antenna until $t_{4,i}$, and $t_{4,i}$ is the TOA of the acknowledgement packet in AP 401. Using these variables, the distance between AP 401 and station 402 can be computed as follows:

$$d_i = ((t_{4,i} - t_{1,i}) - (t_3 - t_2) - T_{1,i} - T_{3,i} - T_1 - T_3)/2 * SOL \quad (\text{Eq. 1})$$

Note that, in one embodiment, $t_3 - t_2$ is set to be equal to a short inter frame space (SIPS).

Assuming the position of an AP is $X_i = [x_i \ y_i]^T$ a position of a station is $X = [x \ y]^T$, then $\hat{d}_i$ as the measured distance between the station and an ith AP can be modeled as:

$$\hat{d}_i = d_i + e_i = T2_i * SOL(\text{speed of light})$$

where $e_i$ is the TOA error (which can be modeled as a Gaussian random variable). Table 1 shows the mean and variance of the TOA error based on channel simulations ($T_x = R_x = 1$).

TABLE 1

| TOA ERROR | | |
|---|---|---|
| CCK | OFDM | OFDM w/o correction |
| N(0, 6.75 m) | N(0, 6.9 m) | (12.3106 m, 13.1475 m) |

Note that $\Delta \hat{d}_i = \hat{d}_i - \hat{d}_j$ the distance difference between the measured distances.

An optimized location solution after finding $\hat{d}_i$ or $\Delta \hat{d}_i$ is to perform the following estimation:

$$\hat{X} = \underset{x}{\operatorname{argmin}} \left\{ \sum_{i=1}^{N} \beta_i \left( \hat{d}_i - \|X - X_i\| \right)^2 \right\}$$

$$\hat{X} = \underset{x}{\operatorname{argmin}} \left\{ \sum_{i,j}^{N} \beta_{i,j} \left( \Delta \hat{d}_{,ji} - \|X - X_i\| + \|X - X_j\| \right)^2 \right\}$$

where the effective combination number of (i,j) is $1+2+, \ldots, +N-1$ with N being the number of APs and $\beta$ is a weighted factor (in one embodiment, set to 1).

In one embodiment, the station or the AP MAC (e.g. MAC 301A or MAC 301B in FIG. 3) can include a 24-bit counter driven by a 40/44/80/88 MHz clock (the frequency depending on the operation mode) to record the time stamp of the TOD and the TOA. This counter can be run in cyclic mode. In one embodiment, the TOD can correspond to when the location-related packet obtains the chance for transmission, whereas the TOA can correspond to when the fine timing is done and processing begins or at the end of a receiving packet.

For an accurate computation, delays $T_{1,i}$ and $T_{3,i}$ need to calibrated at the AP, and delays $T_3$ and $T_1$ need to calibrated at the station. Moreover, the time stamps of $t_1$, $t_2$, $t_3$, and $t_4$ need to be consistently set. However, because $t_{4,i} - t_{1,i}$ is associated with one clock and $t_3 - t_2$ is associated with another clock, the need for synchronization is eliminated (although some minimal frequency offset may still occur, as explained below).

In one embodiment, retransmission is not permitted for unicast packet D and acknowledgement packet D_ACK. Thus, if any error happens, the transaction will be aborted and a new distance measurement transaction will be reinitiated. In that case, the AP and the station can discard all previous, related data.

In one embodiment, when a station switches to a new channel, the station will send a Location Channel Switch frame (a multicast frame) to inform its related APs on that channel (i.e. those APs participating in distance measurements for that station) that a distance measurement procedure might begin. After a Location Channel Switch frame is successfully received, an AP and the station can perform one or more distance measurements (i.e. using the above-described unicast/acknowledgement packets) within a specific measurement interval.

Figure 5:
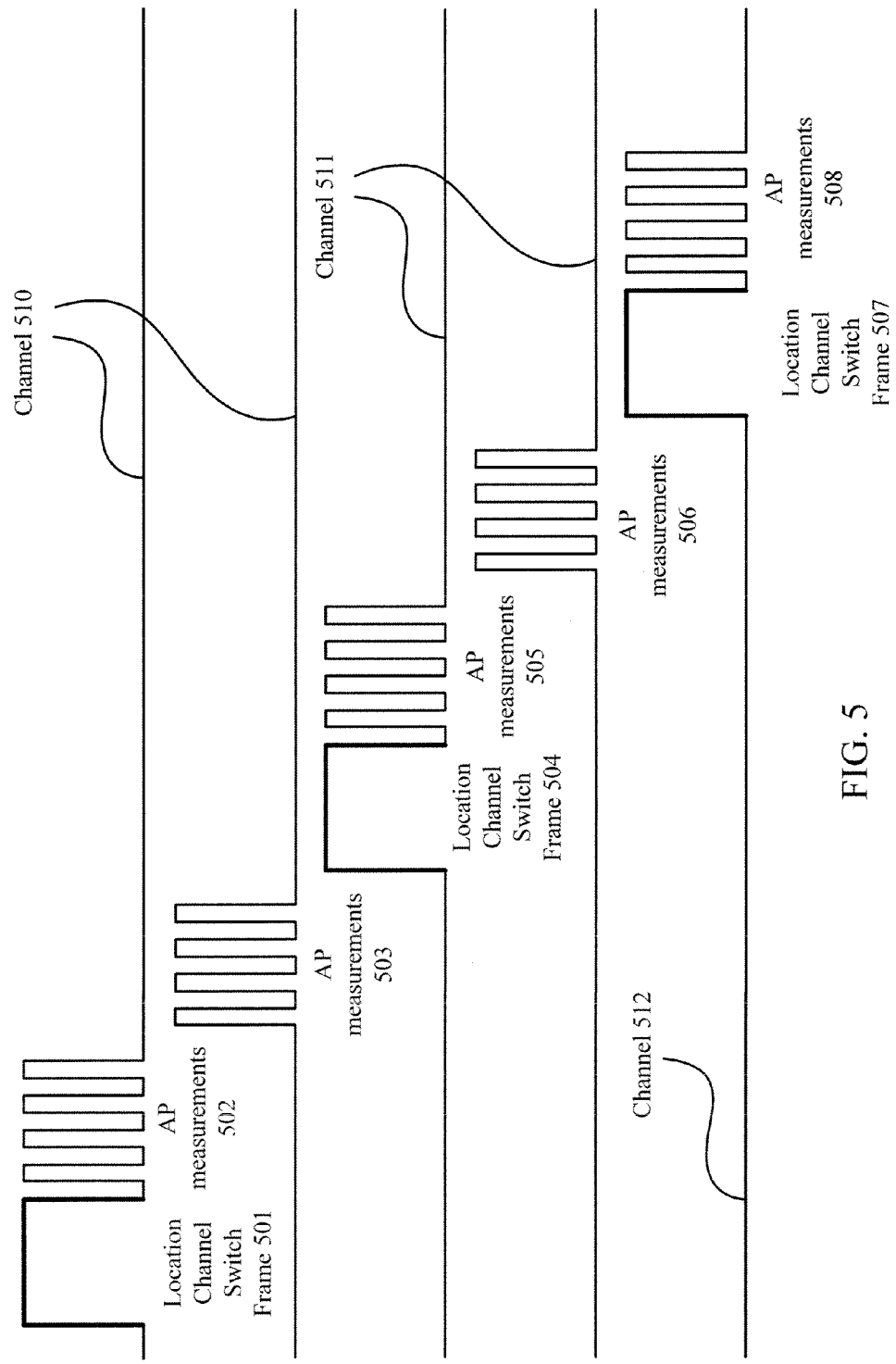
FIG. 5 illustrates that Location Channel Switch frames can be used when a station switches channels, each Location Channel Switch frame preceding the transmission of the unicast and acknowledgment packets on a specific channel.

For example, FIG. 5 illustrates exemplary distance measurements performed on three channels 510, 511, and 512. In this example, two APs are operating on channel 510, two APs are operating on channel 511, and one AP is operating on channel 512. After the station sends the Location Channel Switch frame 501 (which indicates the station is using channel 510), the two related APs on channel 510 can perform their measurements 502 and 503. Similarly, after the station sends the Location Channel Switch frame 504 (which indicates the station is using channel 511), the two related APs on channel 511 can perform their measurements 505 and 506. After the station sends the Location Channel Switch frame 507 (which indicates the station is using channel 512), the one related AP on channel 512 can perform its measurements 508. Note that measurements 502, 503, 505, 506, and 508 have a same, predetermined measurement interval. Further note that multiple APs on the same channel know when to begin their transmission based on a location channel switch frame, a slot list, or contention (e.g. carrier sense multiple access)(all which are well known).

A distance measurement round is finished once the station has accomplished the distance measurement process with each related AP. In one embodiment, this distance measurement round can be repeated until a predetermined tracking duration (e.g. set to at least 2× the time for a typical round) ends, thereby increasing the accuracy of the resulting measurements.

Figure 6:
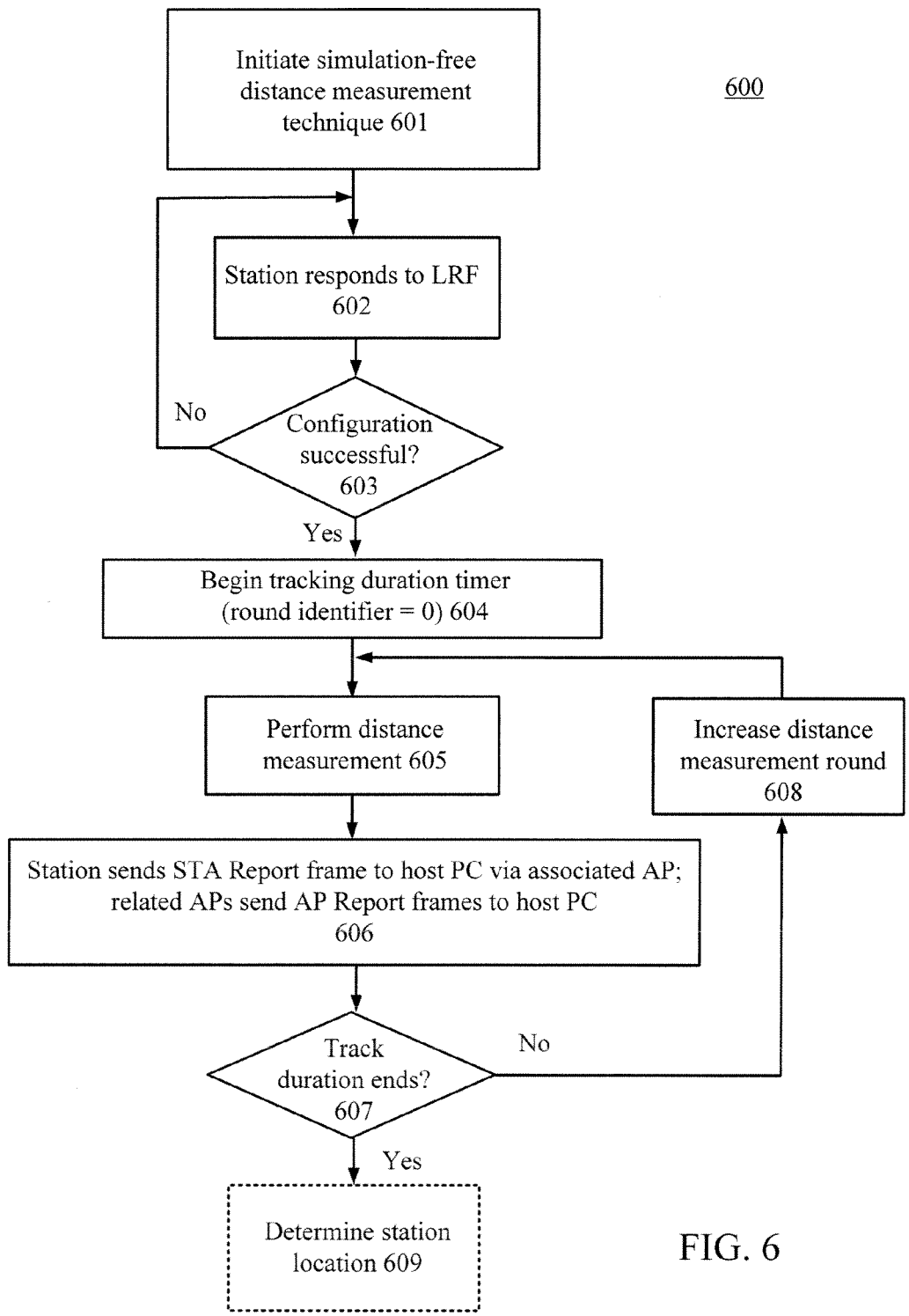
FIG. 6 illustrates a synchronization-free distance measurement technique using a unicast packet and a corresponding acknowledgment packet.

FIG. 6 illustrates an exemplary synchronization-free distance measurement technique 600 that that is initiated in step 601. In one embodiment of step 601, a host PC can send a Location Request Frame (LRF) to the station via its associated AP. In step 602, the station can respond to the LRF by activating its location measurement protocol. In this protocol, the station can compile a list of APs that it can hear (using any known scan technique) and send that list to the host PC (via the associated AP). At this point, the host PC can provide the station with a list of channels and the APs on each channel that will be considered related APs. For example, although the station may hear 10 APs, the host PC may designate only 4 of those APs to be related APs. This determination of related APs can be characterized as the "configuration" of the station for the subsequent distance measurement operation. Note that the associated AP is one of the related APs.

After configuration of the station is successful, as determined in step 603, the station can initialize a tracking duration timer and set a distance measurement round to zero in step 604. In step 605, Location Channel Switch frames, unicast packets D, and acknowledge packets D_ACK can be transmitted/received by the station and its related APs as described above in reference to FIGS. 4 and 5.

In step 606, the values for the TOD(D), TOD(D_ACK), TOA(D), TOA(D_ACK), $t_{1,i}$, $t_2$, $t_3$, and $t_{4,i}$ can be sent to the host PC for computing the distance measurements between the APs and the station. In one embodiment, the station can send its STA Report frame (including TOD(D_ACK), TOA (D), $t_2$, and $t_3$) to the host PC via the associated AP, whereas each of the related APs (i.e. including the associated AP) can send their AP Report frames (including TOD(D), TOA (D_ACK), $t_{1,i}$, and $t_{4,i}$) to the host PC. If the tracking duration timer has not expired, as determined in step 607, then step 608 increases the distance measurement round by "1". In one embodiment, the track duration timer ends when the distance measurement round=1. In other higher accuracy embodiment, the track duration timer ends when the distance measurement round is one of 2, 3, etc. After the tracking duration timer expires, synchronization-free distance measurement technique 600 ends.

Note that the host PC can use the times and delays received from the related APs and the station to compute accurate distances from the station to each of the related APs. These accurate distances, in turn, can be used to determine an accurate location of the station in step 609. In one embodiment, the host PC can repeat steps 601-609 at predetermined intervals to ensure continued, accurate tracking of the station.

Notably, by using synchronization-free distance measurement technique 600, the effects of frequency offset can be advantageously minimized. Specifically, the timing error at the AP due to frequency offset can be computed as $((t_{4,i}-t_{1,i})*ppm_{AP}$, whereas the timing error at the station due to frequency offset can be computed as $((t_3-t_2)*ppm_{STA}$. Note that the SOL (speed of light) is $3*10^8$ m/s, wherein a 10 ns error in timing is a 3 m error in distance. Assuming that only 20 ppm is allowed (which is a generous allowance) and the delta time $(t_3-t_2)$) is 16 μs (which is SIPS as defined in 802.11), then the error is 0.6 m in distance. Because 0.6 m is significantly less than typical error tolerance for asset tracking as well as for security and emergency services, the frequency offset error can be ignored compared to other error sources. In one embodiment, to further minimize the effects of frequency offset, the delta time in the AP (i.e. $(t_{4,i}-t_{1,i})$) can be set as small as possible (e.g. 100 μs).

Figure 7B:
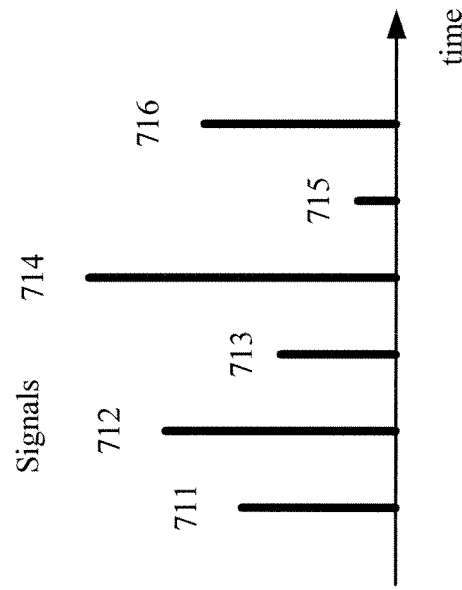
FIG. 7B illustrates an exemplary transmission in which the first signal is not the strongest signal.
Figure 7A:
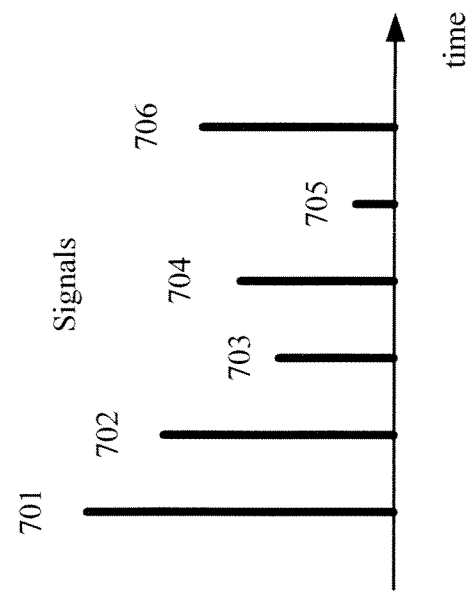
FIG. 7A illustrates an exemplary transmission in which the first signal is the strongest signal.

In accordance with one aspect of this technique, the largest possible error is due to ascertaining the TOA (of the unicast packet D in the station and the acknowledgement packet D_ACK in the AP). For example, referring to FIG. 7A, determining which of signals 701-706 constitutes the TOA of a packet is straight forward because signal 701 is first and is the strongest of signals 701-706. In contrast, referring to FIG. 7B (which represents a typical multipath environment), determining which of signals 711-716 constitutes the TOA of a packet is more challenging because signal 711 is first, but later-received signal 714 is the strongest signal of signals 711-716.

Figure 8:
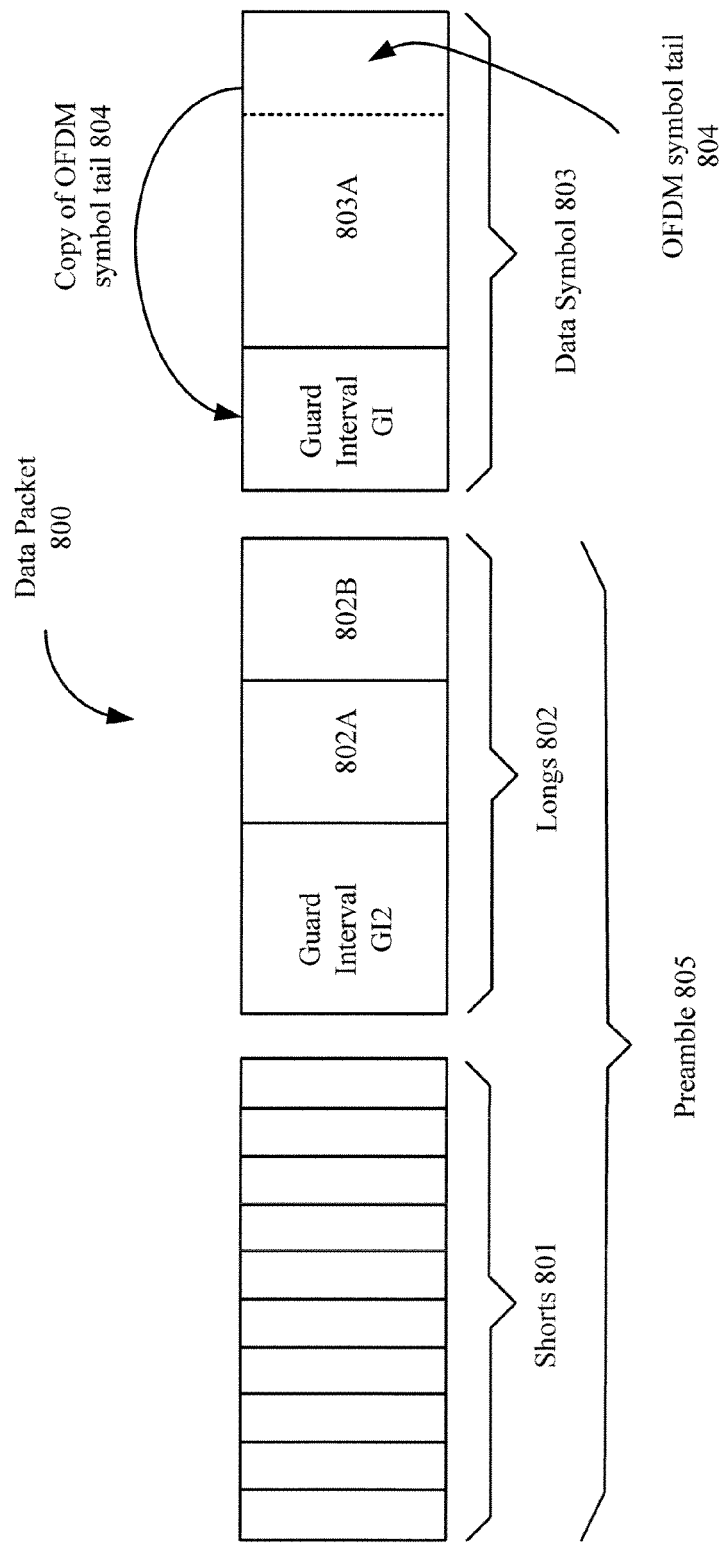
FIG. 8 illustrates a portion of a data packet including short training fields, long training fields, and guard intervals.

In one embodiment for correcting TOA error, correlation can be performed using the long training field (LTF). Note that the 1999 IEEE 802.11 family of standards provides that a transmitted data packet includes a preamble, which precedes the actual data. FIG. 8 illustrates a portion of a data packet 800 including a preamble 805. As defined in the 802.11 standards, preamble 805 includes 10 "short" identical known symbols (hereinafter short training fields or shorts 801) of 0.8 μsec concatenated to 2 "long" identical known symbols 802A-802B of 3.2 μsec (hereinafter long training fields 802A and 802B).

Longs training fields 802A and 802B are typically used to provide channel estimation. Specifically, because long training fields 802A and 802B are known, a receiver can use these symbols to provide channel estimations for a subsequent data symbol 803 in data packet 800. In this manner, long training fields 802A and 802B can increase the likelihood that the received data symbols are correctly interpreted.

In one embodiment of the synchronization-free distance measurement technique, at least one of long training fields (LTFs) 802A and 802B can be used to provide TOA correlation. For example, having done the coarse timing based on the short training fields, the symbol boundary of one of the LTFs can be coarsely located. At this point, the cross-correlation between the known LTF sequence x(n) and received sequence y(t) can be made:

$$\text{cross}(t) = \sum_{n=1}^{128} x(n) * y(t+n)'$$

The first peak of the cross-correlation results correspond to the first arrival path. Based on this first arrival path, the TOA of the data symbol can be computed. Note that although the long training fields in the packet may have noise, they will be compared to known symbols that do not have noise, thereby facilitating cross-correlation as well as facilitating finding the first arrival path.

In another embodiment for correcting TOA error, correlation can be performed using multiple guard intervals (GIs). The 802.11 standards also provide that guard intervals can be placed before the long training fields and each unit of data. Specifically, a double guard interval (GI2) is placed before long training fields 802A and 802B, which together form longs 802. In contrast, a guard interval (GI) is placed before data 803A, which together form data symbol 803.

Based on the results of a fine timing estimation, a GI can be located and denoted as x(n) with n from 1 to 32 at a 40 MHz sample rate. Note that a cyclic prefix is transmitted during the GI. This cyclic prefix is a copy of the end of the OFDM symbol (OFDM symbol tail) 804. Note that a regular GI at 40 MHz (0.8 μs) has 32 samples, whereas a short GI at 40 MHz (0.4 μs) has 16 samples.

A cross-correlation between x(n) and OFDM symbol tail 804 can be performed. Specifically, the strongest path can be aligned (e.g. using a programmable alignment) such that 8 samples are provided pre-curser (i.e. multipaths arrive before the strongest path) and 24 samples are provided post-curser (i.e. multipaths arrive after the strongest path). Because the first arrival path is always the same or before the strongest path, the TOA correction is limited by how many samples are provided pre-curser.

In yet another embodiment of the synchronization-free distance measurement technique, an IFFT (inverse Fourier transform) in combination with the LTF can be used to obtain a channel delay profile. Specifically, the LTF can be used to obtain the channel estimation in the frequency domain. Advantageously, this channel estimation can be manipulated in software using an IFFT to obtain a channel time response (explained in further detail below). Referring back to FIGS. 7A and 7B, this channel time response can facilitate identifying the first signal of the packet in a time domain, e.g. signal 701 or 711, as long as that signal has strength greater than a predetermined threshold. The time of arrival can be computed using this first signal. This LTF and IFFT process is also called TOA adjustment herein.

In one embodiment, this IFFT process can include four steps. In a first step, the IFFT can be used to obtain the channel delay profile $H=\{h_0, h_1, h_2, \ldots, h_{127}\}$. If there is no TOA error, then $h_0$ will be the first arrival path. If an error exists, then the advance and late of timing corresponds to the right and left circular shift of H. In a second step, the maximal absolute value of H can be found. The value and location of this maximal absolute value can be recorded as $h_{max}$ and $L_{max}$. In a third step, a window (e.g. of length 17) can be used to indicate the effective multipath range with $L_{max}$ in the center.

The other 111 values of H will be considered as noise and an estimated noise power ($\sigma^2$) is obtained as the average.

In a fourth step, two thresholds (th1 and th2) can be used to decide the location of the first arrival path (wherein a multipath environment includes multiple paths by definition). For example, in one embodiment, any path location satisfying the following condition can be considered a candidate first arrival path:

$\{i\}=(\text{abs}(h_i)>\sigma*th1) \& (\text{abs}(h_i)>\text{abs}(h_{max})/th2)$ Of the candidate first arrival paths, the first path is deemed to be the first arrival path.

Note that in case the station cannot provide this TOA adjustment itself, the associated AP can make this correction. For example, assuming that the channel is reciprocal and both the station and the associated AP have similar timing information (i.e. the TOA adjustment at the AP is substantially the same as the TOA at the station), the AP can use twice the AP's TOA adjustment value to compensate for the missing station's TOA adjustment.

Note that the location of a legacy station (i.e. a device without location configurability) can be determined using an AP without station support technique 900, as explained in reference to FIG. 9. In this technique, the following TDOA computation can be used.

$$\Delta d_{i,j}=((t_{4,i}-t_{1,i})-(t_{4,j}-t_{1,j})-T_{1,i}-T_{3,i}+T_{i,j}+T_{3,j})/2*\text{SOL} \quad \text{(Eq. 2)}$$

For an accurate computation, delays $T_{1,i}$ and $T_{3,i}$ need to calibrated at the AP, and delays $T_3$ and $T_1$ need to calibrated at the station. Moreover, the time stamps of $t_{1,i}$ and $t_{4,i}$ need to be consistently set. Note that because $t_{4,j}-t_{1,j}$ is associated with one clock and is associated with another clock, the need for synchronization is eliminated (noting that, as described above, the frequency offset is de minimus and may be ignored).

Referring to FIG. 9, the host PC notifies all related APs to enter a station location mode for a predetermined time window in step 901, which means the related APs will not send normal traffic during that time. In step 902, the host PC tells the related APs (at least one for each channel) to start location measurements. In step 903, the host PC tells the related AP (1) the channel to go to (note that at least the associated AP will already be on this channel), (2) the BSSID (basic service set identification) of the associated AP, and (3) the station ID whose location is to be determined. In step 904, each related AP sends a CTS (clear-to-send) packet to the station to inform the station that its transmission is temporarily stopped. In step 905, each related AP switches to the station's channel (if necessary) and sends the above-described unicast packet D to the station with a "borrowed" BSSID (i.e. the BSSID of the associated AP), performs its measurements, and notifies the host PC when these measurements are complete. Note that determining the station location using steps 901-905 can be designated for each related AP in a specific time window by the host PC, i.e. steps 901-905 can be performed consecutively in an AP order designated by the host PC.

Figure 10:
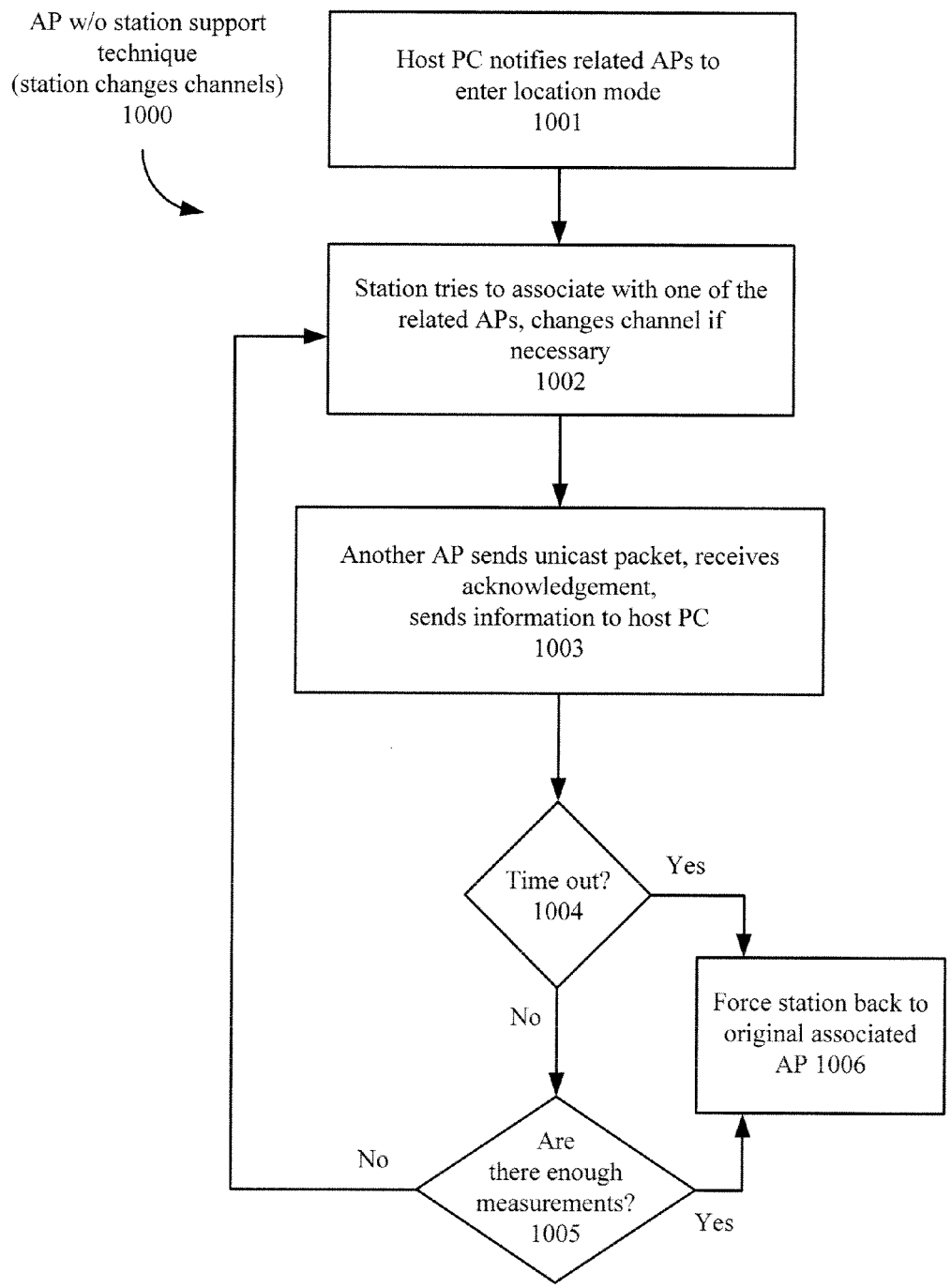
FIG. 10 illustrates another exemplary synchronization-free distance measurement technique using fixed-location APs and a legacy station that can change channels.

An alternative AP without station support technique 1000 is explained in reference to FIG. 10. In this technique, the same assumptions are made (as for technique 900) and the TDOA method (Eq. 2) is used. Referring to FIG. 10, the host PC notifies each related AP to enter a station location mode for a predetermined time window in step 1001, which means the related APs will not send normal traffic during that time and the related APs are instructed not to associate with a particular station. In step 1002, one of the related APs refuses to associate with the station, thereby forcing the station to try to associate with another of the related APs. Note that, if necessary, the station will change channels to accomplish this association. In step 1003, one of the related APs (other than the previously associated AP) sends the above-described unicast packet D, receives an acknowledgment packet, and then sends its information/measurements to the host PC. If a time out condition does not exist (as determined in step 1004) or enough measurements have not yet been made (as determined in step 1005), then the process returns to step 1002 where the station tries to associate with another of the related APs. If a time out condition does exist (as determined in step 1004) or enough measurements have been made (as determined in step 1005), then technique 1000 ends in step 1006 with the host PC forcing the station to associate with one of related APs.

In one embodiment, to avoid the large overhead due to association, any packet that is acknowledged can be used for the station location measurement, thereby avoiding the completion of the whole association process. For example, at 2.4 GHz, a station can send a multicast probe request. All related APs hearing this request (from a station needing locating) can send a probe response to the station (e.g. instead of the unicast packet sent in step 1003), which prompts the station to send an acknowledgment packet to those APs. Those acknowledgement packets can be used for station location measurements. After this exchange, the related APs (with the exception of the original associated AP) can disallow association.

In another example, at 5 GHz, the station can listen for beacons and sends directed probe requests to each AP with a detected beacon. In turn, those APs can send probe responses (once again, instead of the unicast packet sent in step 1003), which trigger the station to send acknowledgement packets (that can be used for station location measurements). Once again, after this exchange, the APs (other than the original associated AP) can disallow association.

Figure 11:
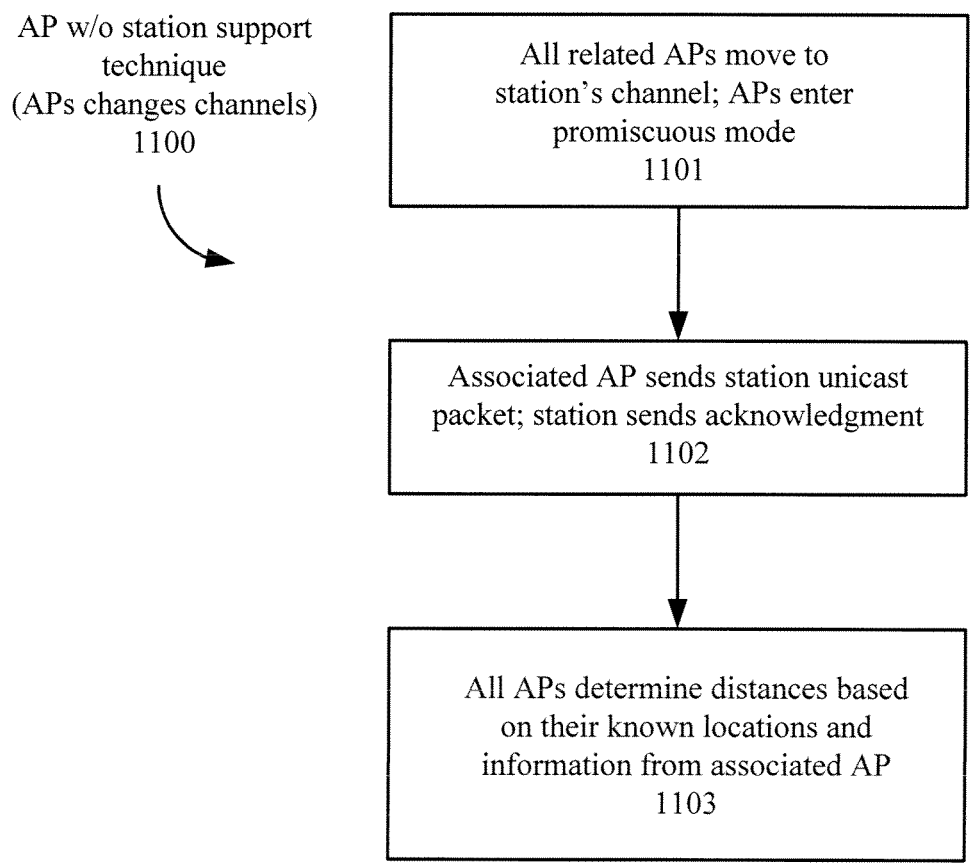
FIG. 11 illustrates another exemplary synchronization-free distance measurement technique using APs that change channels and a legacy station without location support capability.

An alternative AP without station support technique 1100 is explained in reference to FIG. 11. In this technique, the same assumptions are made (as for technique 900) and the TDOA method is used. The associated AP sends unicast packet D at TOD of t0 and $AP_i$ receives D at $t_{0,i}$, where $t_{0,i}$=t0+(distance between associated AP and $AP_i$ divided by speed of light)+time offset between associated AP and $AP_i$ ($T_i$), The station sends D_ACK and the associated AP receives at $t_1$ and the $AP_i$ receives at $t_{1,i}$. The TDOA equation is $\Delta d_{i,j}=t_{1,i}-t_{1,j}-T_i+T_j$.

Referring to FIG. 11, in step 1101, all related APs move to the station's channel at substantially the same time and, with the exception of the associated AP, enter a promiscuous mode in which the communications between the associated AP and the station are overheard. In step 1102, the associated AP can send the station the above-described unicast packet D and the station can respond with an acknowledgment packet. Notably, in the promiscuous mode, the related APs know the source and destination addresses of the associated AP and the client, to sort out the packet exchanges of interest. In this manner, the related APs can hear the downlink packet D as well as the uplink packet D_ACK. In step 1103, all APs can do their distance measurements by using the packet exchange between the associated AP and the station.

Notably, while the difference between TOD(D-ACK) and TOA(D), including their associated fine correction values T3 and T1 is helpful, correct positioning can be found in some cases without these values. For example, if the difference of TOD(D-ACK) and TOA(D), and any associated fine correction values, is consistent over time, the difference TOD(D-ACK) and TOA(D) often cancel out in the calculations. When this cancellation occurs, the location of the device can be calculated without knowing the difference of TOD(D-ACK) and TOA(D) (and their fine corrections) explicitly. In this case, the distance can be computed using:

$$d_i=((t_{4,i}-t_{1,i})-(K)-T_{1,i}T_{3,i})/2*SOL$$

wherein K is a known constant or a known averaged value as discussed below.

There are several ways that the consistency of the difference of TOD(D-ACK) and TOA(D) can be achieved. First, it may be the case that all ranging measurements have the same device receiving the (D) packet and sending the (D-ACK) packet. If this device has a consistent delay between the two events, the TOD(D-ACK) and TOA(D) time difference will be consistent for all measurements. If there is some variance in the difference of TOD(D-ACK) and TOA(D), but on average the value is consistent, multiple measurements could be made, and the results averaged. The averaged measurements would converge to the consistent value of TOD(D-ACK) minus TOA(D), again allowing cancellation of this variable from the equations.

In other embodiment, multiple devices can observe the same single packet exchange which guarantees that the difference of TOD(D-ACK) and TOA(D) are consistent in all measurements, thereby allowing cancellation in the resulting equations computing location. Finally, there are some scenarios in which the packet exchanges between devices result in different devices effecting the value TOD(D-ACK) minus TOA(D). In that case, if all devices used in the measurements are designed to provide exactly the same performance with regard to the difference of TOD(D-ACK) and TOA(D), cancellation in the calculations can again occur. Finally, each device can be characterized for its own TOD(D-ACK) minus TOA(D), and this can be communicated to the device doing the calculation. In this way, even if the different devices participating in the measurements do not have the same delays, the value is known of each device and the calculation can proceed.

Note that each AP knows its location as well as the locations of the other APs. Therefore, each AP knows its distance from the associated AP. As a result, the related APs can derive backward from when they heard the downlink packet to when the downlink packet was launched from the associated AP. After doing this compensation, all APs will have a measurement of the time for the one downlink packet to go to the station, the turnaround time for the acknowledgement packet at the station, and the time for the acknowledgement packet to travel to each of the related APs. Because the downlink time and turnaround time is assumed to be consistent for all the APs, the differences in the measured and then compensated times are the differences in the time of flight of the uplink acknowledgement packet to each of the related APs. Note that the APs themselves could measure the total time between receiving the downlink and the returning acknowledgement packet and tag the measurement with a sequence number. Then, the host PC could do the compensation based on AP location, and group the measurements by sequence number to calculate the ranges for each packet exchange. Notably, in technique 1100, there is no requirement on the consistency of the turnaround time at the client. Specifically, because the measurements at all APs are done on exactly the same packet exchange, whatever the turnaround time was at the station, it is the same in all the measurements.

Figure 12:
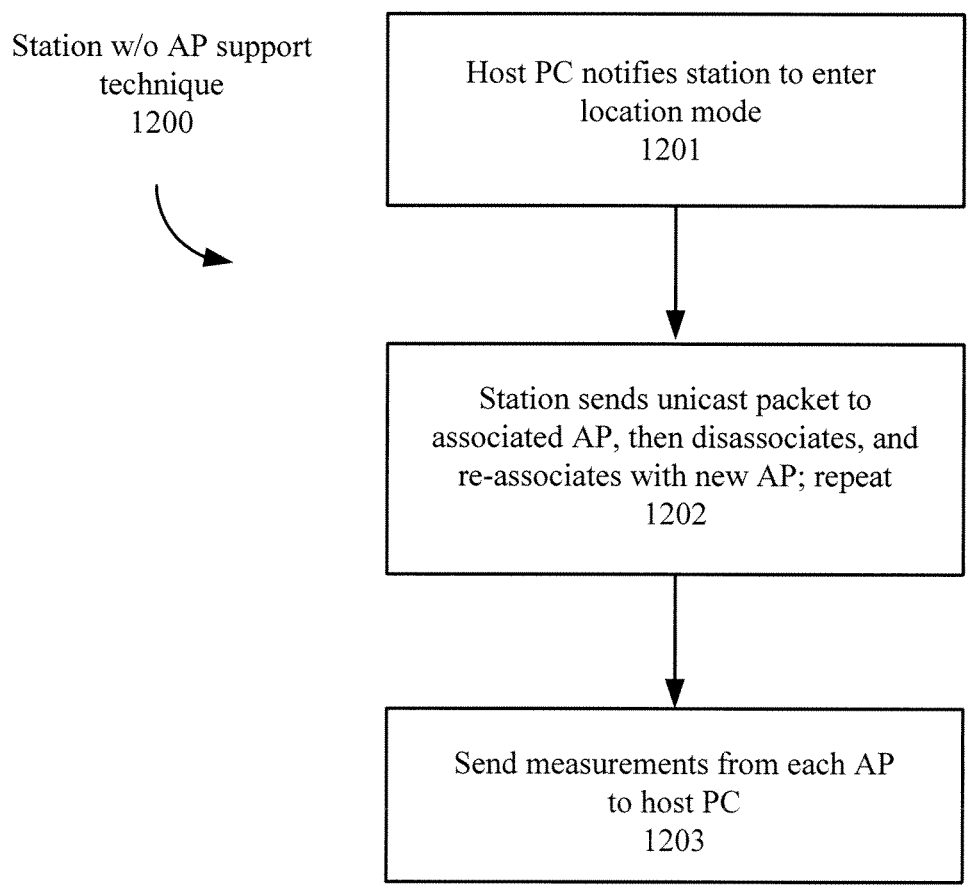
FIG. 12 illustrates another exemplary synchronization-free distance measurement technique using legacy APs and a station with locating capability.

Note that a location configurable station may operate with a legacy AP using certain aspects of the synchronization-free distance measurement technique. FIG. 12 illustrates an exemplary station without AP support technique 1200. In step 1201, the host PC can notify the station to enter the location mode. In step 1202, the station (not the AP) can send the unicast packet D to the associated AP and then disassociate with that AP and re-associate with a new AP. This process can be repeated until a predetermined number of unicast packets have been sent and received. In step 1203, the station can send the measurement results with each AP to the host PC via the associated AP.

Technique 1200 can include using either of equations 1 or 2. If the TOA computation is used (Eq. 1) for technique 1200, then $(t_{4,i}-t_{1,i})$ and the calibrations of $T_{1,i}$ and $T_{3,i}$ are needed. On the other hand, if TDOA computation is used (Eq. 2), then only $(t_{4,i}-t_{1,i})$ is needed. Once again, to avoid the large overhead due to association, any packet that is acknowledged can be used for location measurements, thereby avoiding the completion of the whole association process. For example, a probe request can be acknowledged and therefore can be used for locating. Note that in technique 1200, the acknowledgement times for all associating APs are assumed to be the same and therefore can be calibrated. In this embodiment, the host PC can calibrate $T_1$, $T_3$, and $(t_2-t_3)$ of the associating APs (note that the terms used for the AP and the station would be switched, e.g. referring to FIG. 4, $T_3$ would be the delay from the antenna of the AP to $t_2$).

Notably, in the embodiments described above, the measurements from any number of APs can be supplemented with known, extraneous information, thereby improving the accuracy of the location. For example, in a home environment having multiple stations, both the unicast packet and its acknowledgement packet may be heard by other stations in the same BSSID. If some of those stations' locations are known relative to the associating AP, then the distance measurement from the D/D_ACK set as well as some intelligence of relative locations (such as a map of the house with a few stations (i.e. devices) in known rooms) can be used for locating all of the stations.

In general, determining location in a wireless network uses measurements based on N (N≥3 for 2-dimension and N≥4 for 3-dimension) known locations (known from either from map or GPS). As discussed above with respect to FIG. 2, if N is 2, then the solution is not unique because the solution and its mirroring both satisfy the conditions. However, some intelligence can be applied to pick the correct solution. For example, in one embodiment, assuming a first device (station or AP) is at an unknown location and a second device is at a known location (AP or station). In this case, the second device can be moved to multiple known locations to get multiple measurements, thereby allowing greater certainty to be accorded the measurement associated with the first device. In another embodiment, one device is at the unknown location and N devices are at N known locations. For example, the system can include multiple APs at known locations to locate a station at unknown location. Alternatively, the system can include at least one AP and a number of STAs at relatively known locations to locate multiple STAs at unknown locations.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, although a host PC is discussed above, the location computation can be performed by a different type of hardware device in other embodiments. For example, the location computation could be performed by a central processing unit (CPU), a server, or a microprocessor in other embodiments.

Additionally, the above-described synchronization-free location technique can include locating any device having an unknown location (DUL) using a plurality of devices having known locations (DKLs). For example, in one embodiment, a DUL could include be an AP that has not yet shared its location with other devices. In another embodiment, a DKL could be a station that has a known, fixed location in the wireless network.

Accordingly, it is intended that the scope of the invention be defined by the following Claims and their equivalents.

The invention claimed is:

1. A method of providing synchronization-free station locating in a wireless network, the wireless network including a first device having an unknown location and a second device having a known location, the method comprising:
   (a) sending a first packet from the second device to the first device, the first packet being one of a unicast packet and a probe response packet, the first packet having a time of departure TOD(D);
   (b) receiving the first packet at the first device, the first packet having a time of arrival TOA(D);
   (c) sending an acknowledgement packet from the first device to the second device, the acknowledgment packet having a time of departure TOD(D_ACK);
   (d) receiving the acknowledgment packet at the second device, the acknowledgment packet having a time of arrival TOA(D_ACK); and
   (e) computing a distance between the first device and the second device using a first difference between the TOA (D_ACK) and the TOD(D) and a second difference between the TOD(D_ACK) and the TOA(D);
   (f) moving the second device to another known location and repeating (a)-(e); and
   (g) using a plurality of computed distances between the first and second devices to determine a location of the first device.

2. The method of claim 1, wherein a difference between the TOD(D_ACK) and the TOA(D) is one of a constant value and an averaged value.

3. The method of claim 1, wherein a difference between the TOD(D_ACK) and the TOA(D) is set equal to a short inter-frame space (SIFS).

4. The method of claim 1, further including recording a time stamp of the TOD(D) and the TOA(D_ACK) by driving a counter of a wireless device using a clock.

5. The method of claim 1, further including recording a time stamp of the TOA(D) and the TOD(D_ACK) by driving a counter of the first device using a clock.

6. The method of claim 1, further including:
   when a transmission error occurs, aborting a transaction including the first packet and initiating a new distance measurement transaction with a second packet.

7. A method of providing synchronization-free device locating in a wireless network, the wireless network including a first device having an unknown location and a second device having a known location, the method comprising:
   sending a first packet from the second device to the first device, the first packet being one of a unicast packet and a probe response packet, the first packet having a time of departure (TOD(D));
   receiving the first packet at the first device, the first packet having a time of arrival TOA(D);
   sending an acknowledgement packet from the first device to the second device, the acknowledgment packet having a time of departure TOD(D_ACK);

receiving the acknowledgment packet at the second device, the acknowledgment packet having a time of arrival TOA(D_ACK); and computing a distance between the first device and the second device using a first difference between the TOA (D_ACK) and the TOD(D) and a second difference between the TOD(D_ACK) and the TOA(D);

receiving at least one constraint regarding an environment of the first device; and using the computed distance between the first and second devices and the at least one constraint to determine a location of the first device.

8. The method of claim 7, wherein the at least one constraint is a map.

9. The method of claim 7, wherein a difference between the TOD(D_ACK) and the TOA(D) is one of a constant value and an averaged value.

10. The method of claim 7, wherein a difference between the TOD(D_ACK) and the TOA(D) is set equal to a short inter-frame space (SIFS).

11. The method of claim 7, further including recording a time stamp of the TOD(D) and the TOA(D_ACK) by driving a counter of a wireless device using a clock.

12. The method of claim 7, further including recording a time stamp of the TOA(D) and the TOD(D_ACK) by driving a counter of the first device using a clock.

13. The method of claim 7, further including:
when a transmission error occurs, aborting a transaction including the first packet and initiating a new distance measurement transaction with a second packet.

14. A wireless device forming part of a wireless network including a first device, the wireless device being coupled to a processing unit, the wireless device comprising:
an antenna;
a radio path coupled to the antenna;
a digital baseband unit coupled to the radio path; and
a medium access controller (MAC) coupled to the digital baseband unit,
wherein the wireless device is capable of:
(a) sending a first packet from the wireless device to the first device, the first packet being one of a unicast packet and a probe response packet, the first packet having a time of departure TOD(D);
(b) receiving an acknowledgment packet at the wireless device, the acknowledgment packet having a time of arrival TOA(D_ACK)
(c) receiving a time of arrival TOA(D) when the first device received the first packet, and a time of departure TOD (D_ACK) when the first device sent the acknowledgement packet; and
(d) using the processing unit, computing a distance between the first device and the wireless device using a first difference between the TOA(D_ACK) and the TOD (D) and a second difference between the TOD(D_ACK) and the TOA(D);
(e) repeating (a)-(d) when the wireless device is moved to another known location; and
(f) using a plurality of computed distances between the first device and the wireless device to determine a location of the first device.

15. The wireless device of claim 14, wherein a difference between the TOD(D_ACK) and the TOA(D) is one of a constant value and an averaged value.

16. The wireless device of claim 14, wherein a difference between the TOD(D_ACK) and the TOA(D) is set equal to a short inter-frame space (SIFS).

17. The wireless device of claim 14, the wireless device being further capable of recording a time stamp of the TOD (D) and the TOA(D_ACK) by driving a counter using a clock.

18. The wireless device of claim 14, the wireless device being further capable of:
when a transmission error occurs, aborting a transaction including the first packet and initiating a new distance measurement transaction with a second packet.

19. The wireless device of claim 14, wherein the processing unit includes at least one of a host personal computer, a central processing unit, a server, and a microprocessor.

20. A wireless device forming part of a wireless network including a first device, the wireless device being coupled to a processing unit, the wireless device comprising:
an antenna;
a radio path coupled to the antenna;
a digital baseband unit coupled to the radio path; and
a medium access controller (MAC) coupled to the digital baseband unit,
wherein the wireless device is capable of:
(a) sending a first packet from the wireless device to the first device, the first packet being one of a unicast packet and a probe response packet, the first packet having a time of departure TOD(D);
(b) receiving an acknowledgment packet at the wireless device, the acknowledgment packet having a time of arrival TOA(D_ACK)
(c) receiving a time of arrival TOA(D) when the first device received the first packet, and a time of departure TOD (D_ACK) when the first device sent the acknowledgement packet; and
(d) using the processing unit, computing a distance between the first device and the wireless device using a first difference between the TOA(D_ACK) and the TOD (D) and a second difference between the TOD(D_ACK) and the TOA(D);
(e) receiving at least one constraint regarding an environment of the first device; and
(f) using the computed distance between the first and second devices and the at least one constraint to determine a location of the first device.

21. The method of claim 20, wherein the at least one constraint is a map.

22. The wireless device of claim 20, wherein a difference between the TOD(D_ACK) and the TOA(D) is one of a constant value and an averaged value.

23. The wireless device of claim 20, wherein a difference between the TOD(D_ACK) and the TOA(D) is set equal to a short inter-frame space (SIFS).

24. The wireless device of claim 20, the wireless device being further capable of recording a time stamp of the TOD (D) and the TOA(D_ACK) by driving a counter using a clock.

25. The wireless device of claim 20, the wireless device being further capable of:
when a transmission error occurs, aborting a transaction including the first packet and initiating a new distance measurement transaction with a second packet.

26. The wireless device of claim 20, wherein the processing unit includes at least one of a host personal computer, a central processing unit, a server, and a microprocessor.

27. A wireless device forming part of a wireless network including a first device, the wireless device being coupled to a means for computing, the wireless device comprising:
means for communicating using radio signals;
means for processing a digital baseband signal coupled to the means for communicating; and means for processing packets coupled to the means for processing the digital baseband signal, wherein the wireless device is capable of:
(a) sending a first packet from the wireless device to the first device, the first packet being one of a unicast packet and a probe response packet, the first packet having a time of departure TOD(D);
(b) receiving an acknowledgment packet at the wireless device, the acknowledgment packet having a time of arrival TOA(D_ACK)
(c) receiving a time of arrival TOA(D) when the first device received the first packet, and a time of departure TOD (D_ACK) when the first device sent the acknowledgement packet; and
(d) using the means for computing, computing a distance between the first device and the wireless device using a first difference between the TOA(D_ACK) and the TOD (D) and a second difference between the TOD(D_ACK) and the TOA(D);
(e) repeating (a)-(d) when the wireless device is moved to another known location; and
(f) using a plurality of computed distances between the first device and the wireless device to determine a location of the first device.

28. The wireless device of claim 27, wherein a difference between the TOD(D_ACK) and the TOA(D) is one of a constant value and an averaged value.

29. The wireless device of claim 27, wherein a difference between the TOD(D_ACK) and the TOA(D) is set equal to a short inter-frame space (SIFS).

30. The wireless device of claim 27, the wireless device being further capable of recording a time stamp of the TOD (D) and the TOA(D_ACK) by driving a means for counting using a clock.

31. The wireless device of claim 27, the wireless device being further capable of:
when a transmission error occurs, aborting a transaction including the first packet and initiating a new distance measurement transaction with a second packet.

32. The wireless device of claim 27, wherein the means for computing includes at least one of a host personal computer, a central processing unit, a server, and a microprocessor.

33. A wireless device forming part of a wireless network including a first device, the wireless device being coupled to a means for computing, the wireless device comprising:
means for communicating using radio signals;
means for processing a digital baseband signal coupled to the means for communicating; and
means for processing packets coupled to the means for processing the digital baseband signal,
wherein the wireless device is capable of:
(a) sending a first packet from the wireless device to the first device, the first packet being one of a unicast packet and a probe response packet, the first packet having a time of departure TOD(D);
(b) receiving an acknowledgment packet at the wireless device, the acknowledgment packet having a time of arrival TOA(D_ACK);
(c) receiving a time of arrival TOA(D) when the first device received the first packet, and a time of departure TOD (D_ACK) when the first device sent the acknowledgement packet;
(d) using the means for computing, computing a distance between the first device and the wireless device using a first difference between the TOA(D_ACK) and the TOD (D) and a second difference between the TOD(D_ACK) and the TOA(D);
(e) receiving at least one constraint regarding an environment of the first device; and
(f) using the computed distance between the first device and the wireless device and the at least one constraint to determine a location of the first device.

34. The method of claim 33, wherein the at least one constraint is a map.

35. The wireless device of claim 33, wherein a difference between the TOD(D_ACK) and the TOA(D) is one of a constant value and an averaged value.

36. The wireless device of claim 33, wherein a difference between the TOD(D_ACK) and the TOA(D) is set equal to a short inter-frame space (SIFS).

37. The wireless device of claim 33, the wireless device being further capable of recording a time stamp of the TOD (D) and the TOA(D_ACK) by driving a counter using a clock.

38. The wireless device of claim 33, the wireless device being further capable of:
when a transmission error occurs, aborting a transaction including the first packet and initiating a new distance measurement transaction with a second packet.

39. The wireless device of claim 33, wherein the means for computing includes at least one of a host personal computer, a central processing unit, a server, and a microprocessor.

* * * * *